United States Patent

Kinton et al.

Patent Number: 6,050,475
Date of Patent: Apr. 18, 2000

[54] METHOD AND APPARATUS FOR CONTROLLING DOWNFORCE DURING FRICTION STIR WELDING

[75] Inventors: John D. Kinton, St. Peters, Mo.; Jiri Tlusty, Gainesville, Fla.

[73] Assignee: McDonnell Douglas Corporation, St. Louis, Mo.

[21] Appl. No.: 09/087,416

[22] Filed: May 29, 1998

[51] Int. Cl.[7] .......................... B23K 20/12; B23K 31/02; B23Q 15/00; B27Q 5/00
[52] U.S. Cl. .................. 228/112.1; 228/2.1; 144/142; 144/356
[58] Field of Search ................... 228/2.1, 112.1; 144/142, 134.1, 356

[56] References Cited

U.S. PATENT DOCUMENTS

| | | |
|---|---|---|
| 3,888,405 | 6/1975 | Jones et al. . |
| 4,067,490 | 1/1978 | Jones et al. . |
| 4,619,396 | 10/1986 | Yamamoto . |
| 4,757,932 | 7/1988 | Benn et al. . |
| 4,998,663 | 3/1991 | Cakmak et al. . |
| 5,460,317 | 10/1995 | Thomas et al. . |
| 5,486,262 | 1/1996 | Searle ......................................... 156/580 |
| 5,558,265 | 9/1996 | Fix, Jr. ....................................... 228/2.3 |
| 5,611,479 | 3/1997 | Rosen ......................................... 228/2.1 |
| 5,697,544 | 12/1997 | Wykes ........................................ 228/2.1 |
| 5,718,366 | 2/1998 | Colligan ..................................... 228/112.1 |
| 5,893,507 | 4/1999 | Ding et al. .................................. 228/2.1 |

*Primary Examiner*—Patrick Ryan
*Assistant Examiner*—Cecilia Newsome
*Attorney, Agent, or Firm*—Alston & Bird LLP

[57] ABSTRACT

The present invention provides a friction stir welding device for optimizing the depth of a friction stir welding tool in a workpiece. The welding device includes a spindle and a welding tool in rotatable communication with the spindle. The welding device also includes an inner housing defining an aperture through which the welding tool at least partially extends. Preferably, the inner housing has a plurality of cam followers. The device also includes an outer housing defining an aperture for at least partially receiving the inner housing. The outer housing has a base member and a riser that is rotatably mounted to the base member and that defines a plurality of inclined surfaces upon which the plurality of cam followers ride. The welding device includes a sensor in electrical communication with a controller for measuring the magnitude of force exerted by the welding tool upon the workpiece. In one embodiment, the welding device includes a motor and belt drive assembly responsive to the controller and in operable communication with the riser to modify the depth at which the welding tool is inserted into the workpiece and, correspondingly, the force exerted by the welding tool upon the workpiece.

12 Claims, 12 Drawing Sheets

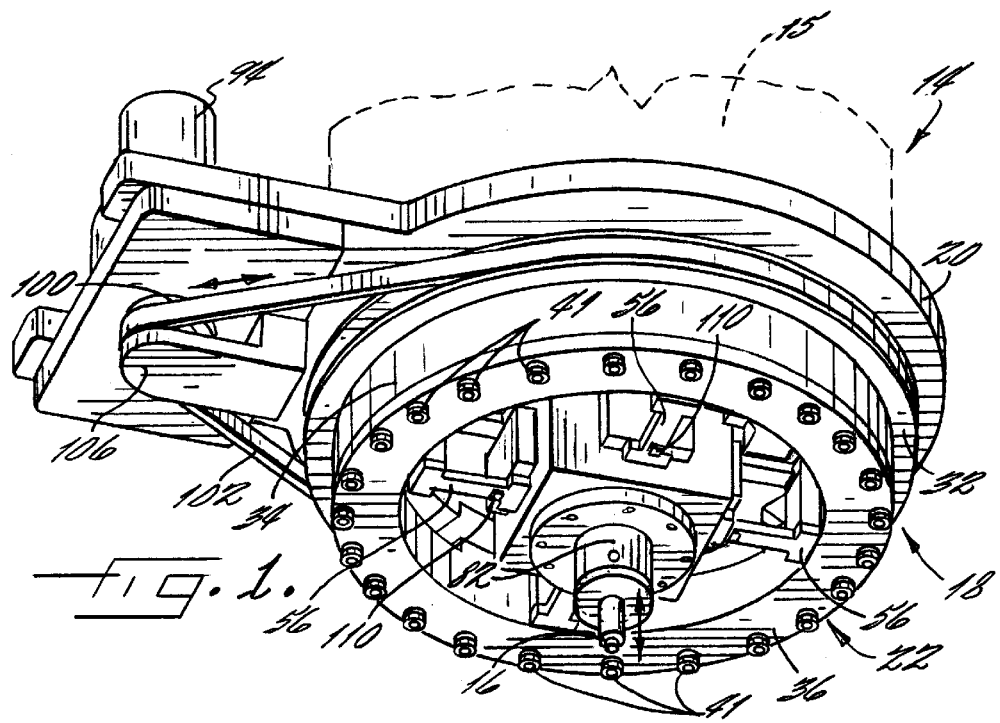
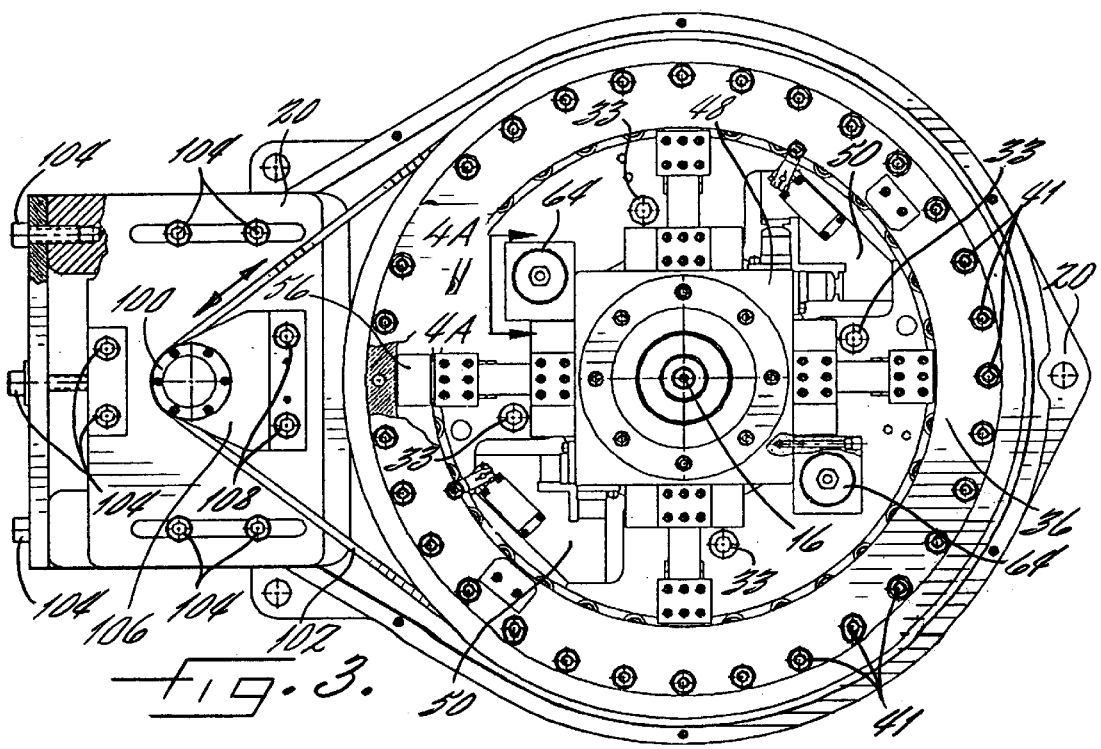

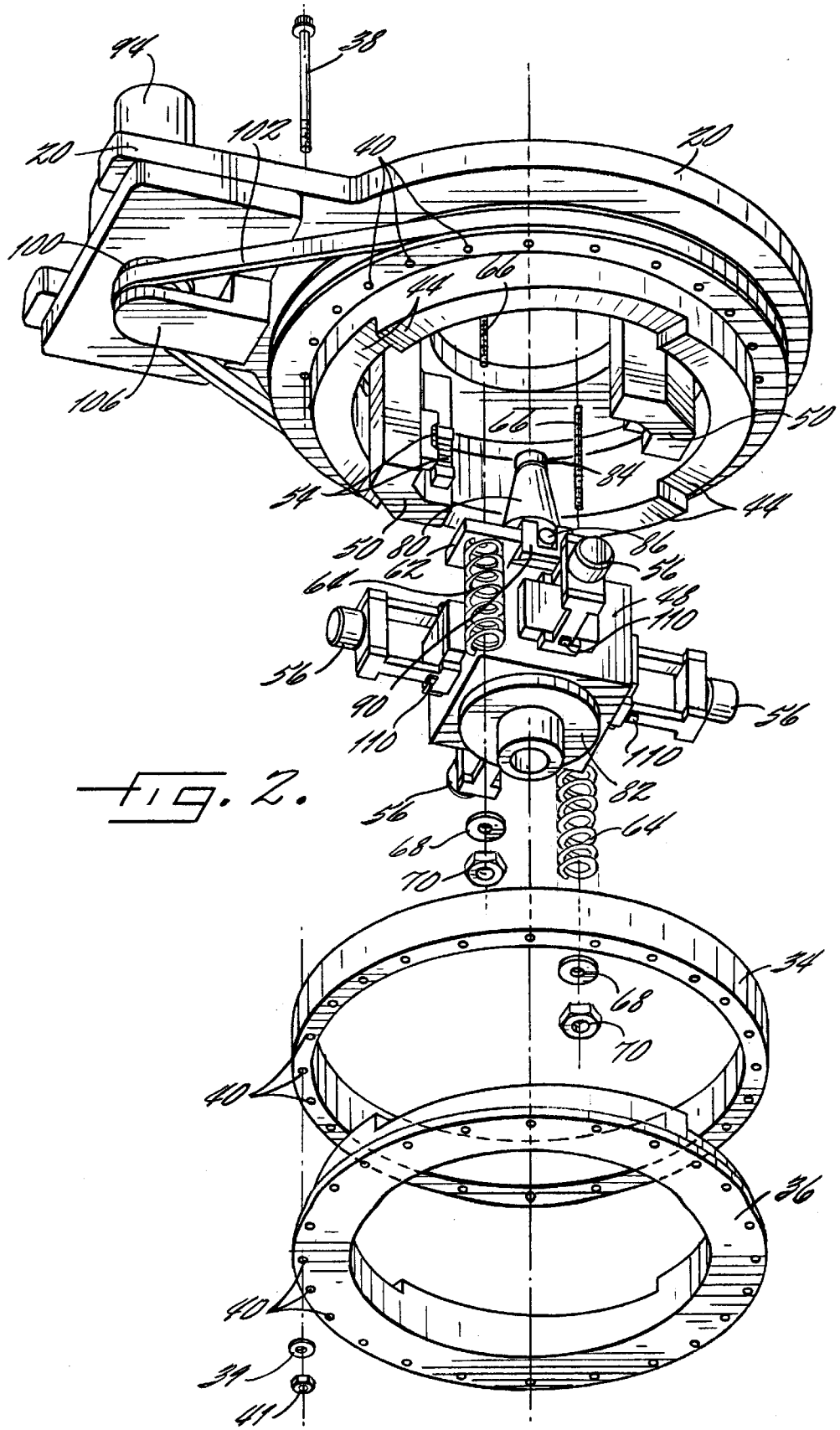

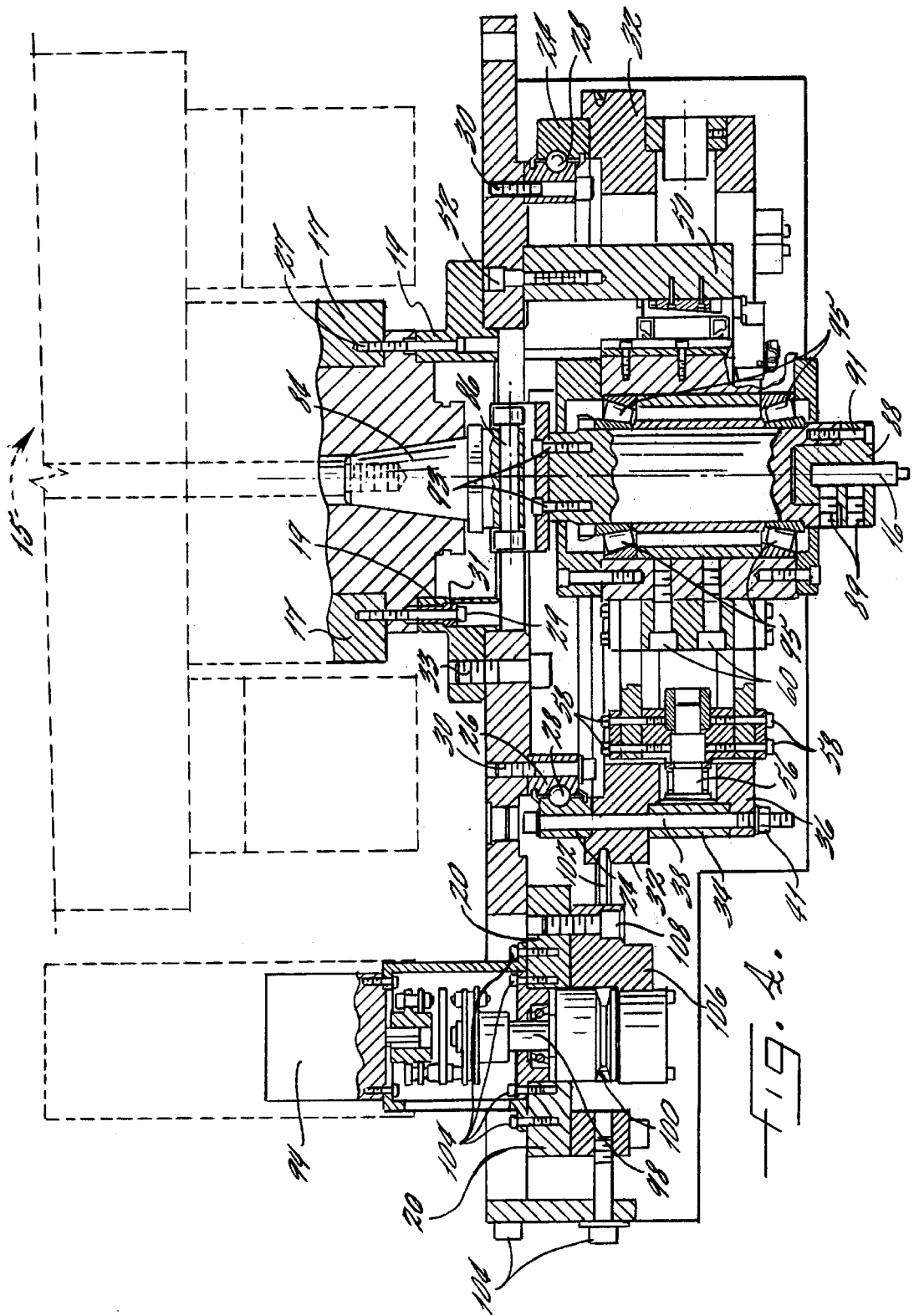

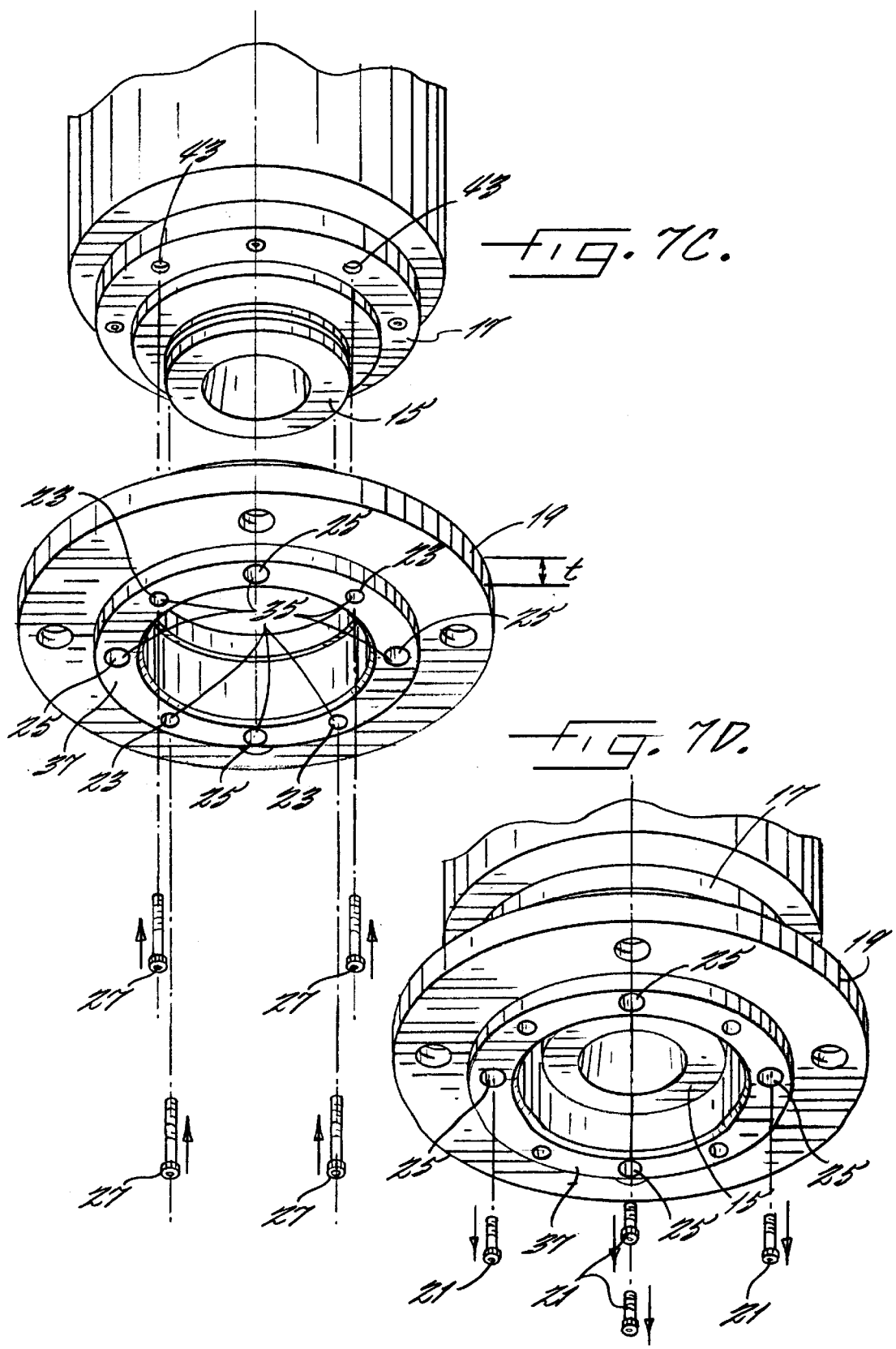

METHOD AND APPARATUS FOR CONTROLLING DOWNFORCE DURING FRICTION STIR WELDING

FIELD OF THE INVENTION

The present invention relates to friction stir welding and, more particularly, relates to controlling the force exerted by a friction stir welding tool.

BACKGROUND OF THE INVENTION

Friction stir welding is a relatively new process using a rotating tool to join two workpieces in a solid state. At present, the process is applied almost exclusively in straight line welds. For example, such a process is described in U.S. Pat. No. 5,460,317 to Thomas et al. When using friction stir welding to join two workpieces, or repair cracks in a single workpiece, one of the primary parameters that must be monitored and controlled is the force exerted by the tool on the workpieces or workpiece. The magnitude of the force exerted by the tool must be maintained above a prescribed minimum in order to generate the required frictional heating of the workpieces. When joining two workpieces along a straight line, the tool is plunged by the friction stir welding machine to the depth necessary to produce the required resistance force to generate the frictional heating. Once that depth is achieved no further monitoring is required provided that proper depth is maintained.

As illustrated in FIGS. 8A and 8B, when joining workpieces 10, 11 having complex, curvilinear geometries, controlling the depth of the tool 9 becomes problematic because the complex geometry 12 may not perfectly match the contoured path 13 that the numerically controlled machine is programmed to follow. If a discrepancy δ between the actual workpiece geometry and the programmed path occurs, the weld joint formed may be defective as the friction stir welding tool will either exceed the optimum depth or else fail to sufficiently penetrate the workpieces. This discrepancy may occur as a result of tolerance build-up during the fabrication of the workpieces being joined, as well as a possible error in the set-up of the workpieces on the friction stir welding machine or other manufacturing or engineering errors.

SUMMARY OF THE INVENTION

The present invention provides an apparatus and an associated method for friction stir welding workpieces having complex, curvilinear geometries. The friction stir welding device includes a milling machine having a spindle in rotatable communication with a friction stir welding tool. Advantageously, since the force exerted by the friction stir welding tool upon the workpieces is related to the depth of penetration of the friction stir welding tool in the workpieces, the depth of the friction stir welding tool may be modified by automatically translating the welding tool in the axial direction relative to the spindle in response to changes in the magnitude of the force exerted by the welding tool upon the workpieces. As such, the method and apparatus of the present invention can adjust the depth of the friction stir welding tool in the workpieces so as to optimize the depth of the tool and the uniformity of the weld joint.

According to one embodiment, the friction stir welding device is provided with first and second coupling members. The first coupling member has first and second opposing ends with the first opposing end being adapted to engage the rotatable spindle. The second coupling member also has first and second opposing ends with the first opposing end being adapted to receive the friction stir welding tool. The second opposing end of the second coupling member is adapted to engage the second opposing end of the first coupling member to thereby communicate the rotation of the spindle to the friction stir welding tool and to permit the axial translation of the friction stir welding tool relative to the spindle.

The friction stir welding device also includes means for measuring the magnitude of the force exerted by the friction stir welding tool upon the workpieces. According to one embodiment, the means for measuring the magnitude of the force includes a computing means in electrical communication with a sensor, such as a strain-gage load cell, a piezo-electric load cell, a dynamometer, a pneumatic load cell, or a hydraulic load cell.

Advantageously, the friction stir welding device also includes means, responsive to the measuring means, for axially translating the second coupling member relative to the first coupling member so as to axially translate the friction stir welding tool relative to the spindle in order to modify the force exerted by the friction stir welding tool upon the workpieces.

According to one embodiment, the axial translating means responsive to the measuring means also includes an inner housing defining an aperture through which the friction stir welding tool at least partially extends. The inner housing has a plurality of cam followers attached thereto. The friction stir welding device also includes an outer housing defining an aperture for at least partially receiving the inner housing. The outer housing has a riser that is rotatably mounted to a base member. The riser defines a plurality of inclined surfaces upon which the plurality of cam followers ride. In the preferred embodiment, the axial translating means also includes a motor in operable communication with a drive assembly, such as a belt drive or a gear drive for moving the riser relative to the inner housing.

In another embodiment, the axial translating means may include a power screw. In still another embodiment, the axial translating means may include an actuator assembly, such as at least one pneumatic actuator arm or at least one hydraulic actuator arm.

The present invention also provides a method of friction stir welding a workpiece including the steps of mounting a friction stir welding tool to a rotatable spindle such that the friction stir welding tool rotates with the spindle. The friction stir welding tool is then inserted into a workpiece and moved through the surface of the workpiece to create a friction stir weld joint. The force exerted by the friction stir welding tool on the workpiece is measured. The depth of the friction stir welding tool in the workpiece is automatically adjusted to optimize the force exerted by the friction stir welding tool upon the workpiece. Preferably, the depth of penetration of the friction stir welding tool in the workpiece is altered by automatically translating the friction stir welding tool in the axial direction relative to the spindle.

Accordingly, there has been provided a friction stir welding device and an associated method of welding allowing for the formation of uniform friction stir weld joints in workpieces having complex, curvilinear geometries. In particular, the friction stir welding apparatus is capable of measuring the force exerted by the friction stir welding tool upon the workpiece and effectively adjusting the depth of the friction stir welding tool in the workpiece in order to optimize the depth of the tool and the uniformity of the weld joint.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1 is a perspective view of a friction stir welding device according to one embodiment of the present invention;

FIG. 2 is an exploded view further illustrating the embodiment of the friction stir welding device of FIG. 1;

FIG. 3 is a bottom view of the friction stir welding device of FIG. 1;

FIG. 4 is a cross sectional view further illustrating the embodiment of the friction stir welding device of FIG. 1;

FIG. 7C is a fragmentary exploded view of one embodiment illustrating the attachment of the base member to the spindle housing of the milling machine of FIG. 7B;

FIG. 7D is a fragmentary perspective view of the base member and spindle housing of FIG. 7C illustrating the removal of the remaining mounting bolts from the spindle housing;

DETAILED DESCRIPTION OF THE PREFERRED EMBODIMENTS

Figure 4A:
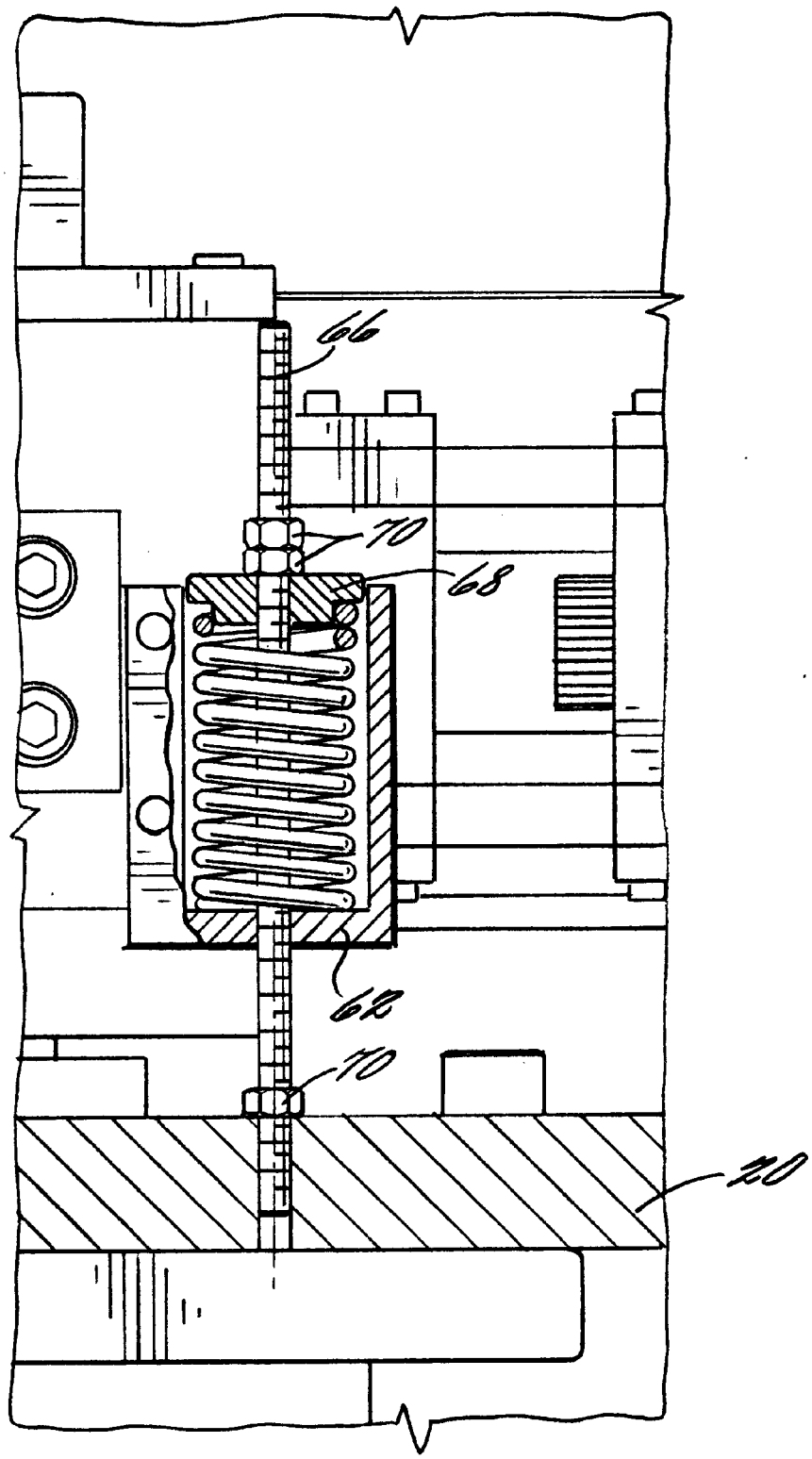
FIG. 4A is a fragmentary cross sectional view along the lines 4A—4A in FIG. 4 illustrating the pre-loaded support spring of the inner housing.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to the drawings, and in particular to FIGS. 1 and 2, there is shown a friction stir welding device 14 according to one embodiment of the present invention. The friction stir welding device includes a milling machine (not shown) having a spindle 15 in rotatable communication with a friction stir welding tool 16. As described below, the friction stir welding device also includes means for measuring the force exerted by the friction stir welding tool upon a workpiece and means, responsive to the measuring means, for automatically translating the friction stir welding tool in the axial direction relative to the spindle in response to changes in the magnitude of the force exerted by the friction stir welding tool upon the workpiece.

In a preferred embodiment, the friction stir welding device includes an outer housing 18 having a base member 20 and a riser 22. As shown in FIG. 4, the riser includes an outer ring 24 slidably mounted to a support ring 26 through ball bearings 28 or roller bearings (not shown), as is well known in the art. The support ring is fixedly mounted to the base member using mounting bolts 30. The riser also includes a pulley 32, a cover 34, and a cap ring 36. The cover, pulley and the cap ring are fastened to the outer ring by a series of mounting bolts 38 that extend through corresponding apertures 40 contained in the outer ring, cap ring, cover, and pulley, and which are secured using washers 39 and nuts 41. As shown in FIG. 2, the underside of the pulley includes a flange 42 having a plurality of inclined surfaces 44. In a preferred embodiment, each of the inclined surfaces on the flange of the pulley corresponds to an inclined surface located on the topside of the cap ring. In the preferred embodiment, the inclined surfaces on the underside of the pulley and the topside of the cap ring, when properly aligned in a facing relationship, form a plurality of helical grooves. In an alternate embodiment (not shown), the underside of the pulley has a plurality of inclined surfaces while the topside of the cap ring is relatively even.

Figure 7A:
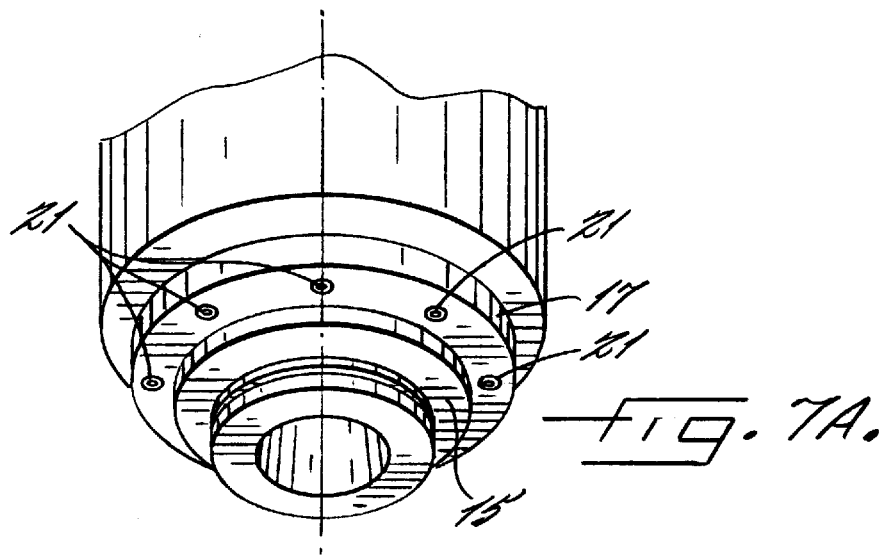
FIG. 7A is a fragmentary perspective view of the spindle housing of a milling machine.

Referring now to FIGS. 4 and 7A–7F, the base member 20 is secured to the spindle housing 17 of the spindle 15 through an adaptor ring 19. As shown in FIG. 7A, the spindle housing of one embodiment is secured to the milling machine using eight mounting bolts 21. The adaptor ring of this embodiment includes a collar 37 also having eight apertures 35 that extend through the collar. The eight apertures 35 in the adaptor ring include four primary apertures 23 and four secondary apertures 25. The primary apertures have a diameter smaller than the diameter of the secondary apertures. Each of the eight apertures 35 corresponds to one of the eight mounting bolts 21. The adaptor ring also includes a circular opening of sufficient diameter to receive the spindle. The periphery of the circular opening is bordered by the collar 37.

Figure 7B:
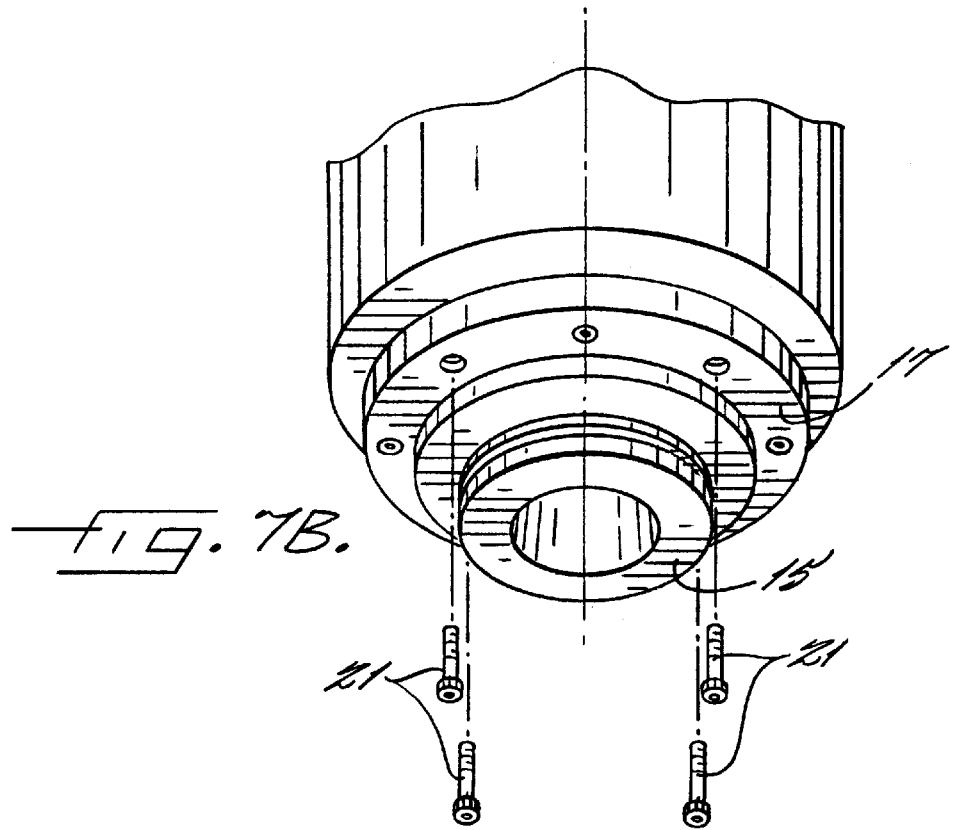
FIG. 7B is a fragmentary exploded view of the spindle housing of a milling machine illustrating the removal of selected mounting bolts.

In order to mount the adaptor ring 19 to the spindle housing 17, four of the spindle-housing-mounting bolts 21 are removed, as is shown in FIG. 7B. The adaptor ring is then positioned adjacent to the spindle housing such that the spindle 15 is aligned with and located within the circular opening in the adaptor ring. The primary apertures 23 in the adaptor ring are then aligned with the threaded openings 43 of the removed spindle-housing-mounting bolts 21. As shown in FIG. 7C, four primary mounting bolts 27 are then inserted through the four primary apertures 23 and securely fastened within the threaded openings in the spindle housing. The primary mounting bolts 27 are longer than the mounting bolts 21 removed from the spindle housing to compensate for the thickness t of the adaptor ring.

The configuration of the spindle-housing-mounting bolts can vary from milling machine to milling machine. To accommodate any variances among the spindle-housing-mounting bolt configurations, more than one adapter ring may be constructed, each having an aperture configuration in the collar of the adaptor ring corresponding to at least one of the spindle-housing-mounting bolt configurations.

Figure 7E:
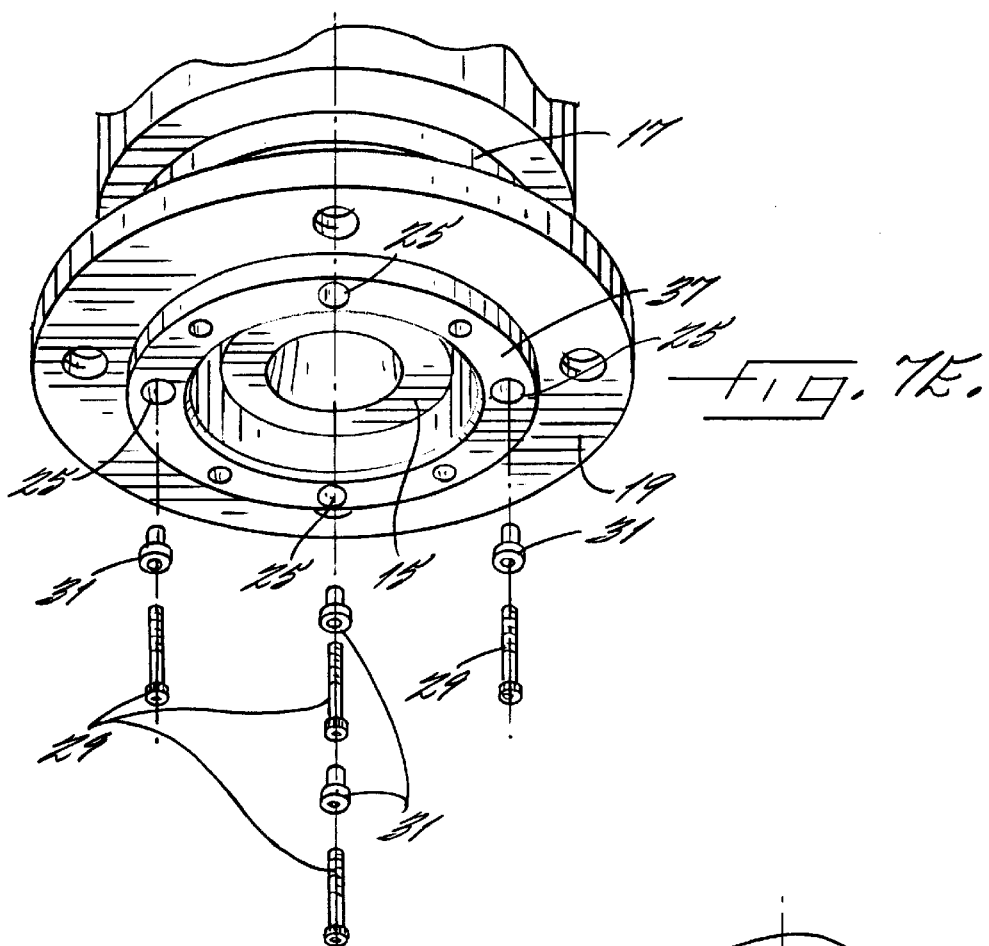
FIG. 7E is a fragmentary perspective view of the base member and spindle housing of FIG. 7D illustrating the installation of the secondary mounting bolts and bushings.
Figure 7F:
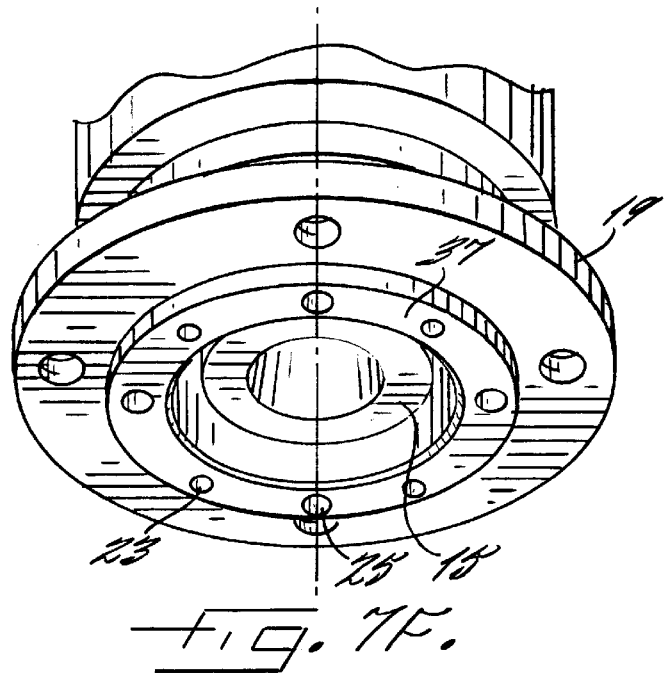
FIG. 7F is a fragmentary perspective view of the base member attached to the spindle housing.
Figure 8A:
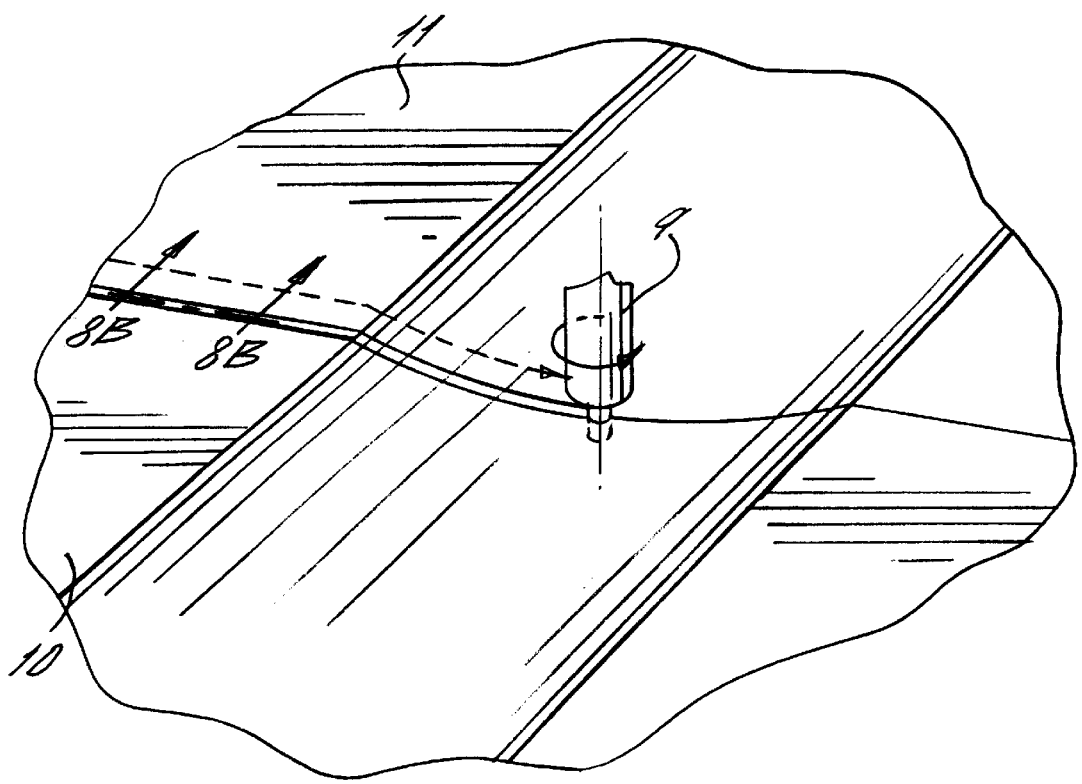
FIG. 8A is a fragmentary perspective view illustrating two workpieces to be joined by friction stir welding.
Figure 8B:
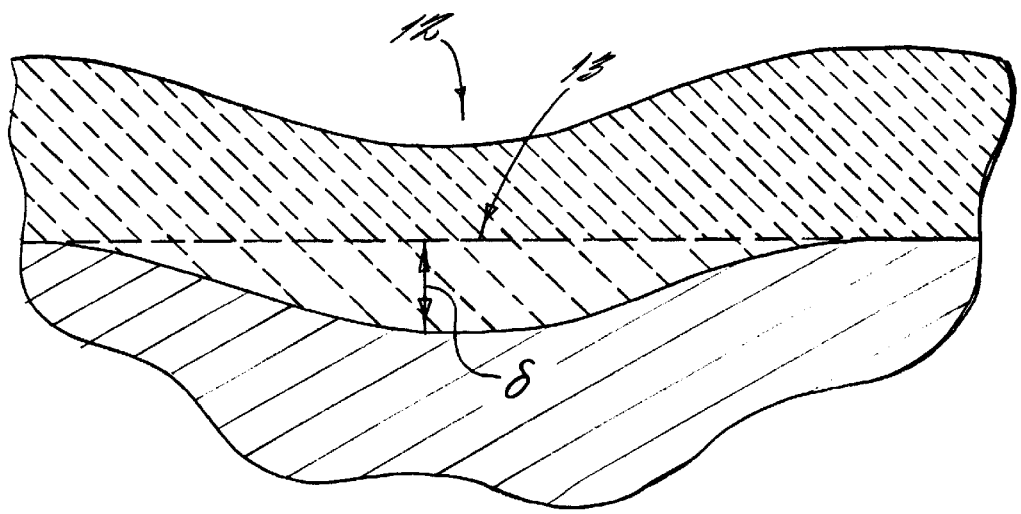
FIG. 8B is a plan view illustrating the conventional path of the numerically controlled friction stir welding tool in a workpiece having a curvilinear geometry and the optimum path as required by the actual surface geometry of the workpieces.

Referring now to FIG. 7D, the diameter of each of the secondary apertures 25 in the adaptor ring is larger than the head size of the corresponding spindle-housing-mounting bolt 21 so that the remaining mounting bolts may be removed with the adaptor ring 19 in place. Once the remaining mounting bolts 21 are removed, the secondary mounting bolts 29 and bushings 31 are inserted through the secondary apertures, as shown in FIG. 7E, and securely fastened to the spindle housing. FIG. 7F illustrates the adaptor ring 19 mounted to the spindle housing.

As shown in FIGS. 3 and 4, the base member 20 is secured to the adaptor ring through mounting bolts 33. The base member includes an aperture 43 for at least partially receiving an inner housing 48, as shown in FIG. 2. The aperture in the base member and the internal cavity created by the outer housing 18 are both of sufficient diameter to allow the mounting bolts 33 to be fastened without the disassembly of the outer housing. As such, the friction stir welding device of the present invention is portable, as it is capable of being easily removed from the spindle housing and transported intact.

Referring now to FIG. 2, recirculating linear guides 50 are mounted to the underside of the base member through mounting bolts 52. The recirculating linear guides contain roller bearings or ball bushings 54 for receiving the corners of the inner housing and securing the inner housing relative to the base member. The inner housing has at least two cam followers 56 mounted to the exterior of the inner housing through mounting bolts 58, 60. The cam followers ride on the upper inclined surface of the helical grooves of the riser 22. In a preferred embodiment, the inner housing is provided with at least two extension plates 62 for mounting corresponding pre-loaded springs 64. As shown in FIGS. 2 and 4A, the extension plates have apertures that align with corresponding apertures in the base member 20. The bolts 66 extend from the base member, through the corresponding apertures and protrude into the cavity formed by the riser. Each of the springs is positioned around a respective bolt 66 and secured using washers 68 and nuts 70. The positioning of the washer and nuts on the bolt compresses the spring creating the desired load in the spring. The pre-loaded springs act to force the cam followers against the inclined surfaces 44 on the flange 42 of the pulley 32.

The friction stir welding device also includes a first coupling member 80 and a second coupling member 82 for communicating the rotation of the milling machine spindle to the friction stir welding tool 16. The first coupling member has at one end a slide holder 84 for releasably securing the first coupling member to the spindle. At the opposite end, the first coupling member has a T-shaped member 86. As shown in FIG. 4, the first coupling member is at least partially received through the aperture 43 in the base member 20.

Figure 6:
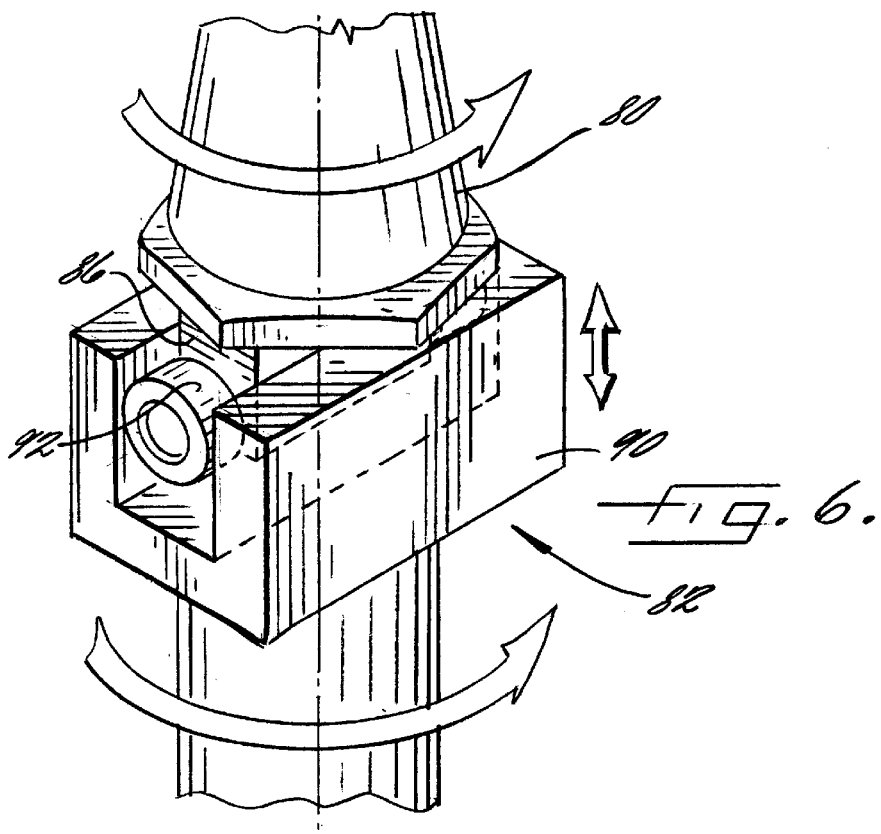
FIG. 6 is a fragmentary perspective view with directional arrows illustrating the translational movement of the second coupling member relative to the first coupling member as both the first and second coupling members rotate in unison.

The second coupling member has at one end a slide or tool holder 88 with set screws 89 for securing the friction stir welding tool to the second coupling member. As shown in FIG. 4, the slide or tool holder is secured to the second coupling member by bolt 91. At the opposite end, the second coupling member has a U-shaped member 90 secured by bolts 93 for receiving the T-shaped member of the first coupling member 80. As shown in FIG. 6, the first and second coupling members rotate in unison with the spindle. Advantageously, the T-shaped member of the first coupling member has rollers 92 rotatably attached to the opposing ends of the T-shaped member so that the U-shaped member can move axially relative to the T-shaped member without interfering with the rotational movement of the first and second coupling members, or the spindle and the friction stir welding tool. In another embodiment (not shown), the U-shaped member is positioned on the end of the first coupling member while the T-shaped member is positioned on the end of the second coupling member.

As shown in FIG. 4, the inner housing 48 has an aperture for at least partially receiving the second coupling member 82. The inner housing also has a plurality of roller bearings 95 positioned along the contact surfaces between the second coupling member and the inner housing so that the second coupling member may rotate relative to the inner housing.

The friction stir welding device is also provided with means for automatically translating the friction stir welding tool 16 in the axial direction relative to the spindle 15. In one embodiment, as shown in FIGS. 1, 2, 3, and 4, the axial translating means of the friction stir welding device includes a servomotor 94 and a belt drive assembly 96. For example, the servomotor may include a Kollmorgen ServoDisc DC motor. The belt drive assembly includes a shaft 98 in operable communication with the motor, a primary pulley 100 in operable communication with the shaft, and a belt 102 in operable communication with both the primary pulley 100 and the pulley 32 of the outer housing 18. According to one embodiment, the motor is mounted on one side of the base member 20 through a series of mounting bolts 104. The primary pulley of this embodiment is then supported on the other side of the base member by a secondary support member 106 secured to the base member by mounting bolts 108.

Figure 5A:
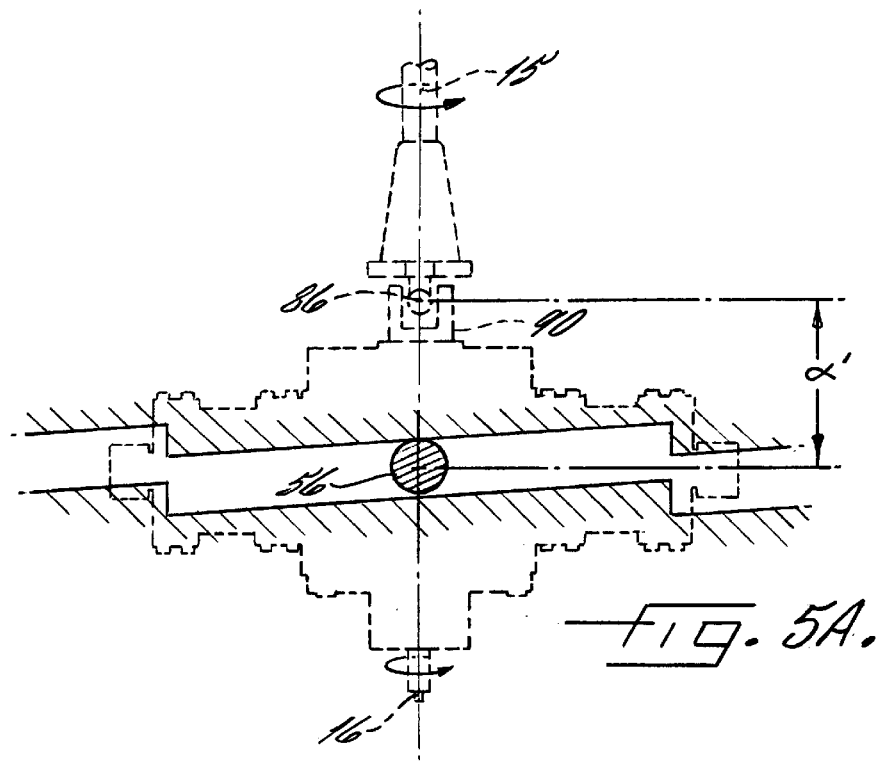
FIG. 5A is cross sectional view of a friction stir welding device of one embodiment illustrating the location of the cam followers relative to the first coupling member.
Figure 5B:
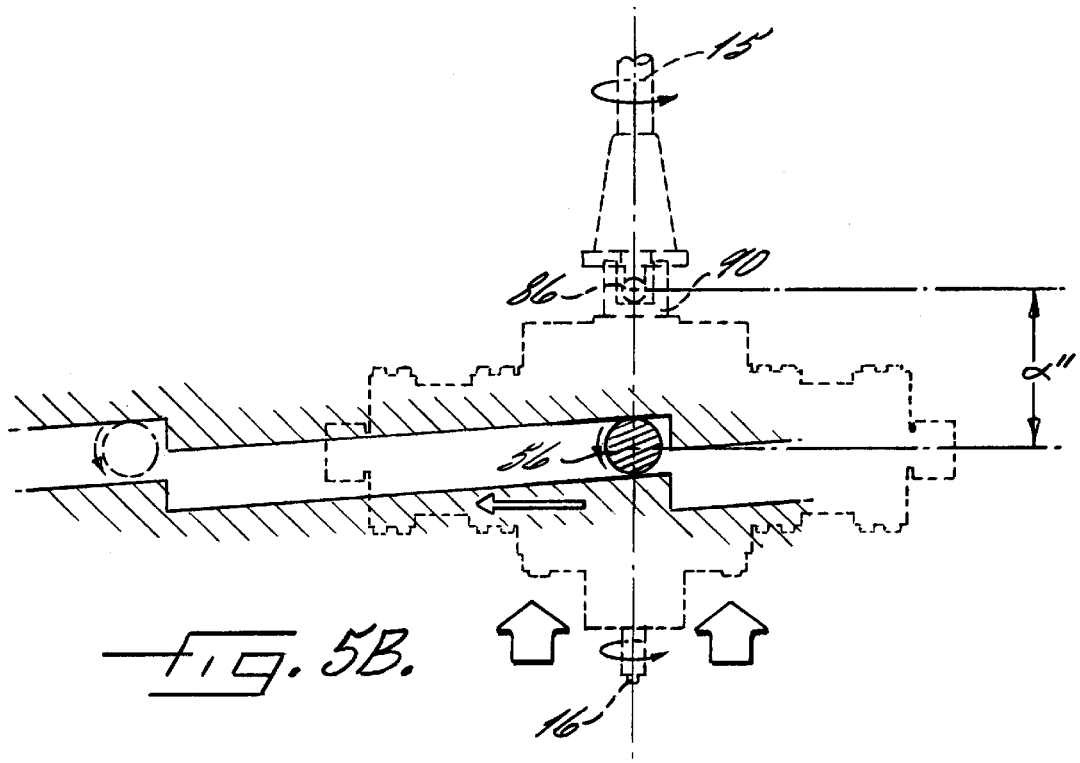
FIG. 5B is cross sectional view of the friction stir welding device of FIG. 5A with directional arrows illustrating the translational movement of the friction stir welding tool relative to the spindle and the location of the cam followers relative to the first coupling member.
Figure 5C:
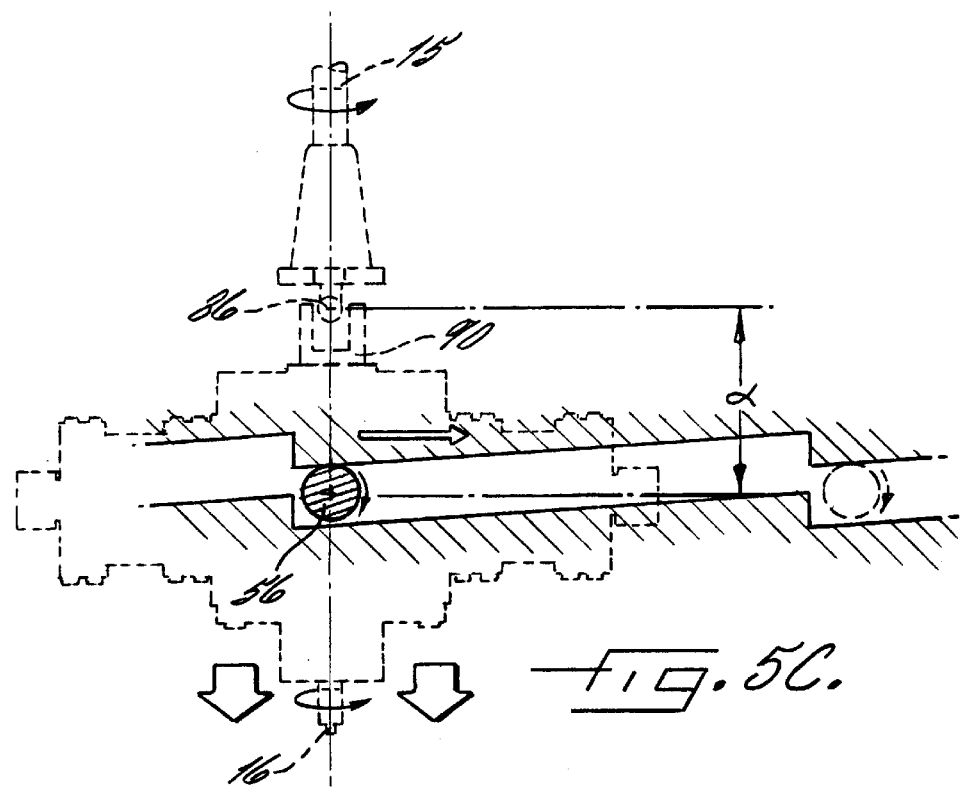
FIG. 5C is cross sectional view of a friction stir welding device of FIG. 5A with directional arrows illustrating the translational movement of the friction stir welding tool relative to the spindle and the location of the cam followers relative to the first coupling member.

Advantageously, rotation of the pulley 32 of the outer housing 18 rotates the riser 22 causing the cam followers 56 to ride upon the upper inclined surfaces of the helical grooves. As shown in FIG. 5A–5C, movement of the cam followers 56 along the inclined surface modifies the axial position of the friction stir welding tool 16 relative to the spindle. Initially, the friction stir welding tool is plunged into the workpiece to the proper depth within the workpiece. As shown in FIG. 5A, the cam followers maybe initially positioned at the median point of the respective inclined surface so that the distance between the T-shaped member 86 of the first coupling member 80 and the cam followers is a distance designated by $\alpha'$. The cam followers are maintained in this position so long as the depth of the friction stir welding tool, and thus the force exerted by the tool upon the workpiece, remains constant.

As shown in FIG. 5B, rotation of the motor in the clockwise direction causes the cam followers 56 to ride up the inclined surfaces, stopping at the point of highest elevation. As illustrated by the arrows in FIG. 5B, the movement of the cam followers causes the inner housing, and thus the U-shaped member 90 and the friction stir welding tool 16, to move axially upwards relative to the T-shaped member 86 and the spindle 15. The distance between the T-shaped member and the cam followers at this position is designated $\alpha''$. Advantageously, as the inner housing and the U-shaped member move axially upwards, the T-shaped member slides within the groove of the U-shaped member, thereby adjusting the axial position of the friction stir welding tool without interfering with the rotation of either the spindle or the friction stir welding tool. As the cam followers ride up the inclined surface, the depth of the friction stir welding tool decreases.

Similarly, as shown in FIG. 5C, rotation of the motor in the counterclockwise direction causes the cam followers 56 to ride down the inclined surfaces, stopping at the point of lowest elevation. As illustrated by the arrows in FIG. 5C, the movement of the cam followers causes the inner housing, and thus the U-shaped member 90 and the friction stir welding tool, to move axially downwards relative to the T-shaped member 86 and the spindle 15. The distance between the T-shaped member and the cam followers at this position is designated $\alpha$. Advantageously, as the inner housing and the U-shaped member move axially downwards, the T-shaped member slides out of the groove of the U-shaped member, thereby adjusting the axial position of the friction stir welding tool without interfering with the rotation of either the spindle or the friction stir welding tool. As the cam followers ride down the inclined surface, the depth of the friction stir welding tool increases.

The throw of the cam followers is equal to the difference between the designations $\alpha$ and $\alpha''$. In a preferred embodiment, the throw will be in the range of approximately 0.1 inches to 0.25 inches. However, the throw of the cam followers may be varied so long as it is large enough to account for any reasonable tolerance build-up in the workpieces. For a relatively large throw, the friction stir welding device may also be used to feed the friction stir welding tool into and out of the workpiece in addition to maintaining the tool at a predetermined depth of penetration in the workpiece.

As previously discussed, in one embodiment, the inclined surfaces on the underside of the pulley and the topside of the cap ring, when properly aligned in a facing relationship, form a plurality of helical grooves. The length of the helical grooves is dependent upon several parameters, including the desired throw of the cam followers and the slope of the helical grooves. The slope of the helical grooves is in turn at least partially dependent upon the available power output from the axial translating means. Preferably, the slope has a more gradual incline for axial translating means having relatively small available power outputs than for axial translating means with large available power outputs. In one embodiment, each helical groove will span a distance approximately equal to $(\pi r)((360°/n)/180°)$, where n designates the total number of helical grooves and r designates the distance from the axis of the second coupling member to the center of the helical groove. However, the helical grooves can span a combined distance greater than or less than the circumference of the circle which has as its center axis the second coupling member. Where the helical grooves span a combined distance greater than $2\pi r$, r again designating the distance from the axis of the second coupling member to the center of the helical groove, the point of lowest elevation of each helical groove will overhang the point of highest elevation of the adjacent helical groove.

The axial translating means may also include a servomotor and gear drive assembly, a power screw, a pneumatic actuator arm, or a hydraulic actuator arm. In one embodiment (not shown), the pulley 32 of the outer housing is replaced with a crowngear that is driven, such as in a 1:9 transmission ratio, by a pinion that is attached to the shaft of the servomotor/gearbox. The drive preferably contains a planetary transmission of about 1:100. For a friction stir welding device having two helical grooves, each spanning approximately 170° and having a rise or throw of 0.1 inches, the total transmission ratio would require that the motor perform 440 revolutions for 0.1 inches of travel.

The friction stir welding device also includes means for measuring the force exerted by the friction stir welding tool upon the workpiece. As shown in FIG. 2, the means for measuring may include one or more strain gages 110. A plurality of strain gages may be used to form a strain-gage load cell for greater accuracy. Strain gages have an advantage over piezoelectric gages in that strain gages do not leak the signal and deliver a real DC signal. However, the measuring means may also include other types of sensors, such as piezoelectric load cells, dynamometers for measuring torque, pneumatic load cells, or hydraulic load cells, all of which are well known in the art.

In another embodiment in which a servomotor in conjunction with either a belt drive or gear drive serves as the axial translating means, the servomotor current may be used as a measure of the axial force of the friction stir welding tool upon the workpiece since the whole feed drive chain is reasonably friction free. In other words, the axial force of the friction stir welding tool may be resolved from the current required to turn the riser 22.

The measuring means also preferably includes a computing means, such as a computer or controller operating under software control. The computing means is in electrical communication with both the measuring means and the axial translating means so as to automatically translate the friction stir welding tool 16 in the axial direction relative to the spindle 15. In a preferred embodiment, the computing means will also be in electrical communication with the milling machine, however, electrical communication of the computing means with the milling machine is not necessary to practice the invention.

Figure 9:
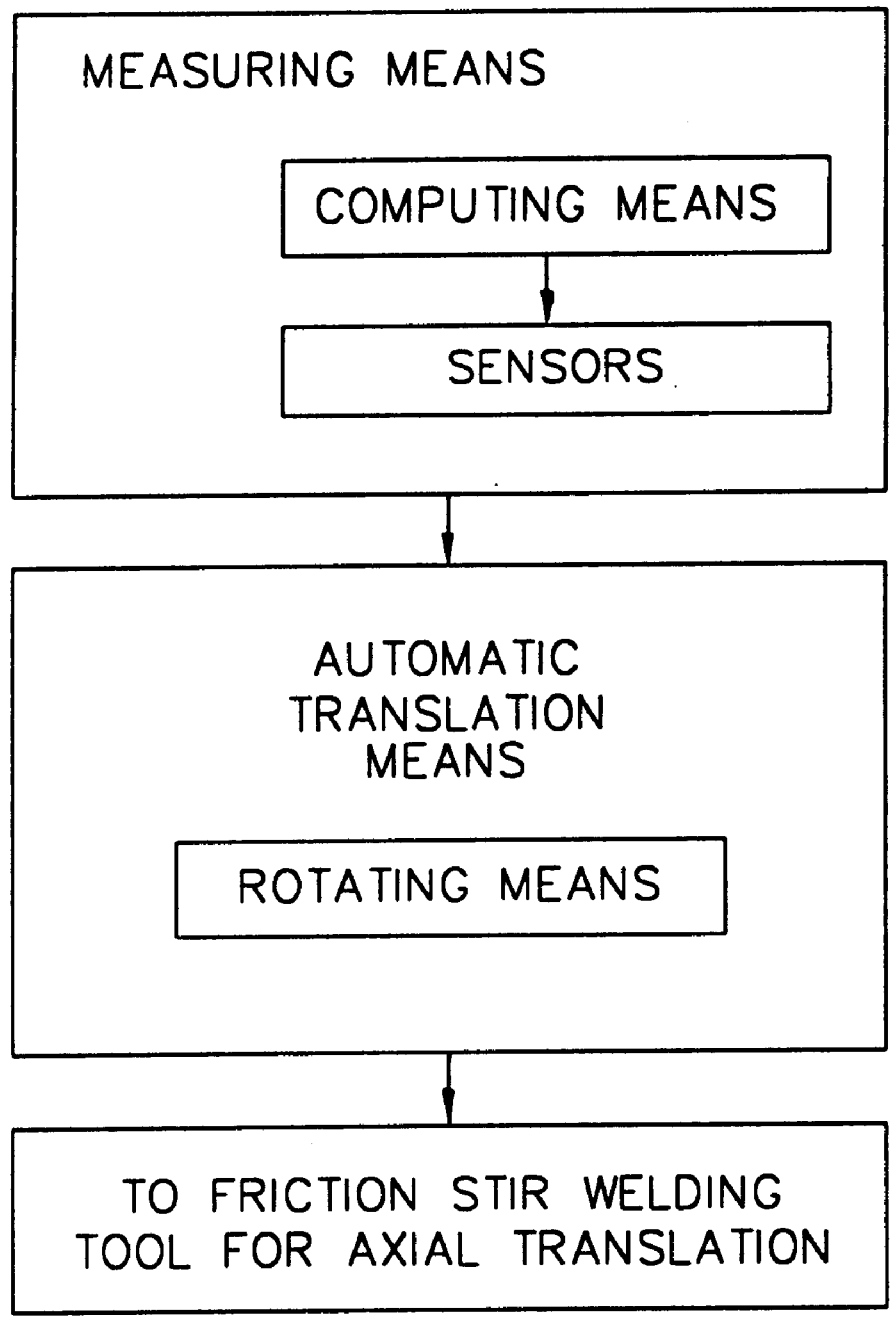
FIG. 9 is a block diagram of a friction stir welding device according to an embodiment of the present invention.

As shown in FIG. 9, in operation, the computing means compares the magnitude of the force exerted by the friction stir welding tool upon the workpiece, as measured by the measuring means, to a predetermined range or value. In a preferred embodiment, the predetermined value or range will be between 100 lbs. and 10,000 lbs. For example, a 0.04" thick lap weld will require a predetermined range between 600 lbs and 1000 lbs, with a preferred predetermined range of 600 lbs to 700 lbs. For a 0.5" thick butt weld, the predetermined value may be 10,000 lbs. The magnitude of the force exerted by the friction stir welding tool is related to the feed rate, material properties, and the depth of penetration of the friction stir welding tool in the workpiece. If the magnitude of the force is too low, the computing means instructs the axial translating means to axially translate the friction stir welding tool downwards. If the magnitude of the force is too high, the computing means instructs the axial translating means to axially translate the friction stir welding tool upwards. The process of measuring the magnitude of the force exerted by the friction stir welding tool upon the workpiece is carried out repeatedly during the friction stir welding process in order to optimize the depth of the friction stir welding tool and compensate for tolerance build-up in the workpiece or workpieces.

In one embodiment, the measuring means includes one or more strain gages in electrical communication with a controller. The controller of this embodiment is also in electrical communication with the axial translating means, such as a servomotor which is, in turn, in operable communication with the pulley 32 of the outer housing 18 through a primary pulley 100 and belt 102. Preferably, the strain gages of this embodiment are positioned on the arms carrying the shafts of the cam followers so that the strain-gages will be in a nonrotating part of the friction stir welding device. The electrical signal representing the force exerted by the friction stir welding tool upon the workpiece is communicated by the strain gages to the controller. The controller then compares the magnitude of the force, as resolved from the electrical signal communicated by the strain gages, to an optimum value or range. If the magnitude is too low, the controller directs the servomotor to rotate the primary pulley of this embodiment in the counterclockwise direction, thereby rotating the outer housing in the counterclockwise direction, as shown in FIG. 5C. This movement increases the depth of the friction stir welding tool in the workpiece, thus increasing the force exerted by the friction stir welding tool upon the workpiece. The controller continues to instruct the servomotor to turn the primary pulley until the depth of the friction stir welding tool in the workpiece imparts a force having a magnitude within the optimum range. Once the magnitude of the force enters the optimum range, the controller directs the servomotor to maintain the torque necessary to hold the primary pulley in position so as to maintain the depth of the friction stir welding tool within the workpiece.

Alternatively, if the magnitude of the force is too high, the controller directs the servomotor to rotate the primary pulley of this embodiment in the clockwise direction, thereby rotating the outer housing in the clockwise direction, as shown in FIG. 5C. This movement decreases the depth of the friction stir welding tool in the workpiece, thus decreasing the force exerted by the friction stir welding tool upon the workpiece. The controller continues to instruct the servomotor to turn the primary pulley until the depth of the friction stir welding tool in the workpiece imparts a force having a magnitude within the optimum range. Once the magnitude of the force enters the optimum range, the controller directs the servomotor to maintain the torque necessary to hold the primary pulley in position so as to maintain the depth of the friction stir welding tool within the workpiece.

Although several examples of measuring means and axial translating means have been provided, it should be appreciated that other combinations of measuring means and axial translating means can be utilized while falling within the scope of the present invention.

Figure 10:
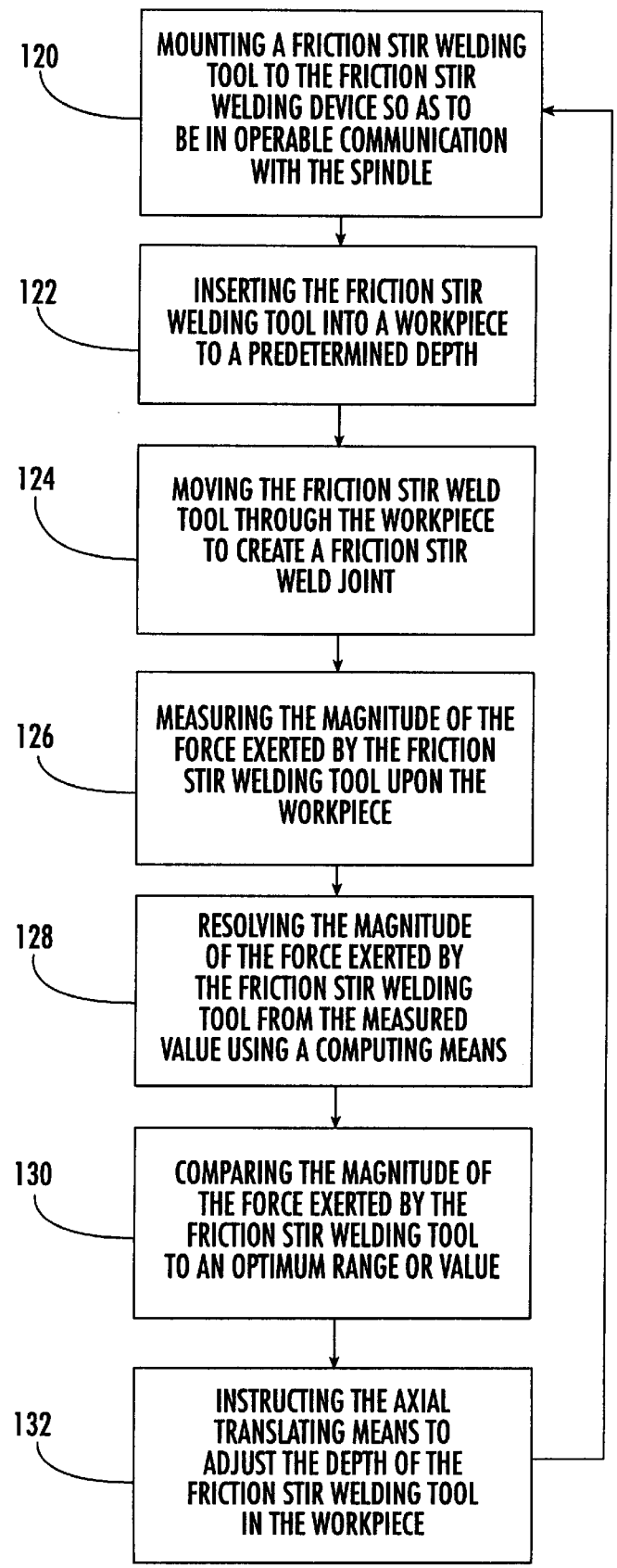
FIG. 10 is a flow chart showing the steps for friction stir welding according to an embodiment of the present invention.

The present invention also provides a method of friction stir welding a workpiece. As shown in FIG. 10, the method of friction stir welding includes the steps of mounting a friction stir welding tool to the friction stir welding device so as to be in operable communication with a rotatable spindle. See block 120. The friction stir welding tool is then inserted into a workpiece to a predetermined depth. See block 122. The friction stir welding tool is then moved through the workpiece to create a friction stir weld joint. See block 124. The magnitude of the force exerted by the friction stir welding tool on the workpiece is measured by the measuring means. See block 126. The computing means then resolves the magnitude of the force exerted by the friction stir welding tool from the measured value. See block 128. Thereafter, the computing means compares the magnitude of the force exerted by the friction stir welding tool to an optimum range or value. See block 130. If the magnitude is too low, the computing instructs the axial translating means to plunge the friction stir welding tool into the workpiece. See block 132. If the magnitude is too high, the computing means instructs the axial translating means to withdraw the friction stir welding tool from the workpiece. See block 132. Preferably, the depth of the friction stir welding tool in the workpiece is adjusted by automatically translating the friction stir welding tool in the axial direction relative to the spindle. The measuring, resolving, comparing and adjusting steps are then repeated to optimize the depth of the friction stir welding tool and the uniformity of the weld joint, during the friction stir welding process.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An apparatus for attachment to a rotatable spindle for controlling the force exerted by a friction stir welding tool upon a workpiece, comprising:

an inner housing defining an aperture through which said friction stir welding tool at least partially extends, said inner housing having a plurality of cam followers;

an outer housing defining an aperture for at least partially receiving said inner housing, said outer housing having a base member and a riser, said riser rotatably mounted to said base member and defining a plurality of inclined surfaces upon which said plurality of cam followers ride;

means for measuring the magnitude of force exerted by the friction stir welding tool upon the workpiece; and means, responsive to said measuring means and in rotatable communication with said riser, for rotating said riser relative to said inner housing to thereby move the cam followers along the respective inclined surfaces so as to modify the force exerted by the friction stir welding tool upon the workpiece.

2. An apparatus according to claim 1 wherein said means for measuring comprises a sensor and computing means in electrical communication with said sensor, and wherein said sensor is selected from a group consisting of a strain-gage load cell, a piezoelectric load cell, a dynamometer, a pneumatic load cell, and a hydraulic load cell.

3. An apparatus according to claim 1 wherein said rotating means comprises a drive assembly and a motor in operable communication with said drive assembly, and wherein said drive assembly is selected from a group consisting of a belt drive and a gear drive.

4. An apparatus according to claim 1 wherein said rotating means is comprised of an actuator assembly selected from a group consisting of at least one pneumatic actuator arm and at least one hydraulic actuator arm.

5. An apparatus for friction stir welding, comprising:

a milling machine having a rotatable spindle;

a friction stir welding tool in rotatable communication with said spindle;

an inner housing defining an aperture through which said friction stir welding tool at least partially extends, said inner housing having a plurality of cam followers;

an outer housing defining an aperture for at least partially receiving said inner housing, said outer housing having a base member and a riser, said riser rotatably mounted to said base member and defining a plurality of inclined surfaces upon which said plurality of cam followers ride;

means for measuring the magnitude of force exerted by the friction stir welding tool upon the workpiece; and means, responsive to said measuring means and in rotatable communication with said riser, for rotating said riser relative to said inner housing to thereby move the cam followers along the respective inclined surfaces so as to modify the force exerted by the friction stir welding tool upon the workpiece.

6. An apparatus according to claim 5 wherein said means for measuring comprises a sensor and computing means in electrical communication with said sensor, and wherein said sensor is selected from a group consisting of a strain-gage load cell, a piezoelectric load cell, a dynamometer, a pneumatic load cell, and a hydraulic load cell.

7. An apparatus according to claim 5 wherein said rotating means comprises a drive assembly and a motor in operable communication with said drive assembly, and wherein said drive assembly is selected from a group consisting of a belt drive and a gear drive.

8. An apparatus according to claim 5 wherein said rotating means comprises at least one power screw.

9. An apparatus according to claim 5 wherein said rotating means is comprised of an actuator assembly selected from a group consisting of at least one pneumatic actuator arm and at least one hydraulic actuator arm.

10. A method of friction stir welding a workpiece, comprising:

mounting a friction stir welding tool to an inner housing having a plurality of cam followers such that the friction stir welding tool is in rotatable communication with a rotatable spindle;

inserting the friction stir welding tool into a workpiece;

measuring the force exerted by the friction stir welding tool on the workpiece; and rotating a riser of an outer housing relative to the inner housing to automatically adjust the depth of the friction stir welding tool in the workpiece to thereby modify the force exerted by the friction stir welding tool upon the workpiece.

11. A method as claimed in claim 10, further comprising the step of:

automatically translating the friction stir welding tool in the axial direction relative to the spindle to thereby modify the force exerted by the friction stir welding tool upon the workpiece.

12. A method as claimed in claim 10, further comprising the step of:

moving the friction stir welding tool through the workpiece to create a friction stir weld joint.

* * * * *

UNITED STATES PATENT AND TRADEMARK OFFICE
CERTIFICATE OF CORRECTION

PATENT NO. : 6,050,475
DATED : April 18, 2000
INVENTOR(S) : Kinton et al.

It is certified that error appears in the above-identified patent and that said Letters Patent is hereby corrected as shown below:

Title page, [56] References Cited, insert the following:

-- OTHER PUBLICATIONS

*Friction-Stir-Welding Tool With Real-Time Adaptive Control*; NASA Tech Briefs, February 1997.--.

Signed and Sealed this

Twentieth Day of March, 2001

*Attest:*

NICHOLAS P. GODICI

*Attesting Officer*   *Acting Director of the United States Patent and Trademark Office*